(12) United States Patent
Madanapalli et al.

(10) Patent No.: US 9,785,426 B2
(45) Date of Patent: Oct. 10, 2017

(54) METHODS AND APPARATUS TO MANAGE APPLICATION UPDATES IN A CLOUD ENVIRONMENT

(71) Applicant: VMWARE, INC., Palo Alto, CA (US)

(72) Inventors: Narendra Prasad Madanapalli, Bangalore (IN); Vinay V, Bangalore (IN); Kumaran Kamala Kannan, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 319 days.

(21) Appl. No.: 14/711,821

(22) Filed: May 14, 2015

(65) Prior Publication Data

US 2016/0246586 A1    Aug. 25, 2016

(30) Foreign Application Priority Data

Feb. 19, 2015   (IN) .............................. 810/CHE/2015

(51) Int. Cl.
  *G06F 9/44*     (2006.01)
  *G06F 9/445*    (2006.01)
  *H04L 29/08*    (2006.01)
  *G06F 9/50*     (2006.01)

(52) U.S. Cl.
  CPC ................. *G06F 8/65* (2013.01); *G06F 9/50* (2013.01); *H04L 67/10* (2013.01)

(58) Field of Classification Search
  CPC ........................................................ G06F 9/44
  USPC ................................................ 717/168–173
  See application file for complete search history.

(56) References Cited

U.S. PATENT DOCUMENTS

| | | | |
|---|---|---|---|
| 7,953,890 B1* | 5/2011 | Katkar | G06F 11/00 709/219 |
| 2002/0063886 A1* | 5/2002 | Johnson | G06F 3/1203 358/1.15 |
| 2005/0080874 A1* | 4/2005 | Fujiwara | H04L 67/1097 709/217 |
| 2011/0321028 A1* | 12/2011 | Evans | G06F 8/68 717/170 |

* cited by examiner

*Primary Examiner* — Jae Jeon

(57) ABSTRACT

Methods, apparatus, and systems to manage application updates in a cloud environment are disclosed. Disclosed example methods include determining that a collector in a collector bank is available to process a task, the task to at least one of request an application version or request an application update and sending the task from a task queue to the collector to determine which compute node is to execute the task. Disclosed example methods also include enqueuing the task on a target queue based on a routing key assigned to the task by the collector, the routing key to specify the compute node to execute the task, and sending the task to the compute node associated with the target compute node queue.

20 Claims, 9 Drawing Sheets

METHODS AND APPARATUS TO MANAGE APPLICATION UPDATES IN A CLOUD ENVIRONMENT

RELATED APPLICATIONS

Benefit is claimed under 35 U.S.C. 119(a)-(d) to Foreign application Serial No. 810/CHE/2015 filed in India entitled "METHODS AND APPARATUS TO MANAGE APPLICATION UPDATES IN A CLOUD ENVIRONMENT", on Feb. 19, 2015, by VMware, Inc., which is herein incorporated in its entirety by reference for all purposes.

FIELD OF THE DISCLOSURE

This disclosure relates generally to virtualized computing environments, and, more particularly, to managing application updates in a cloud environment.

BACKGROUND

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than before.

Deployment tools currently in use are usually a patchwork of various software products from different vendors and/or homegrown solutions. Such tools are generally process-driven with heavy reliance on custom scripts and property files. Traditional deployment tools are also not configured for scaling with cloud computing platforms that dynamically provision virtual computing resources.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
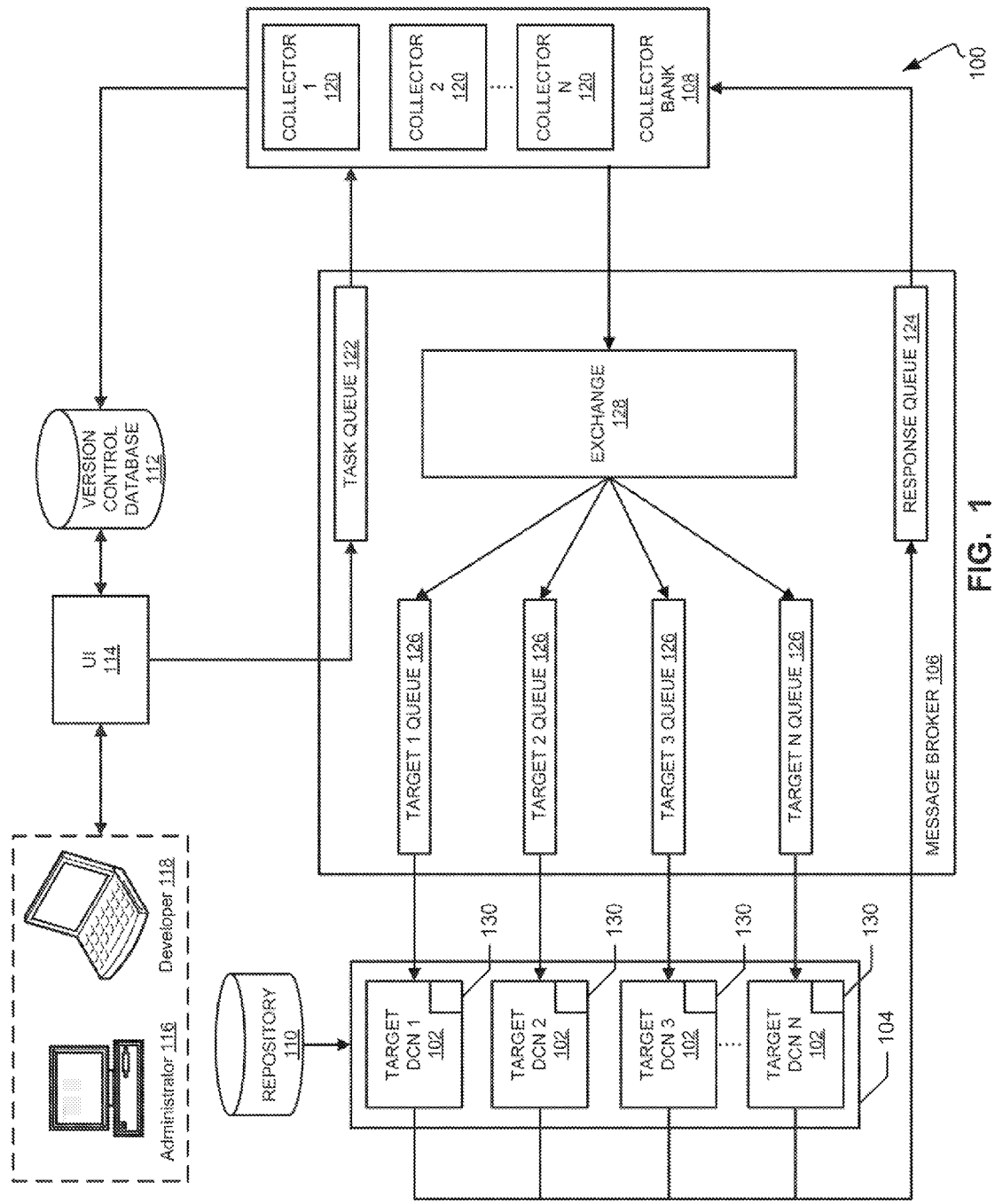
FIG. 1 is a block diagram of an example system constructed in accordance with the teachings of this disclosure for managing application updates in a cloud environment.

Managing applications in a cloud environment is a challenging task, especially when application updates are required to protect data compute nodes (DCNs) in the cloud environment from security vulnerabilities. Because many modern cloud environments include many heterogeneous systems (e.g., a variety of types of DCNs, a variety of operating systems, etc.), managing application updates is a complex and time consuming task. For example, different DCNs and/or operating systems may have different communication capabilities, communication protocol requirements, etc. Additionally, within the cloud environment, DCNs may be deployed dynamically as more services are required by users of the cloud environment. As the number of DCNs in the cloud environment grow, manual and one-to-one (e.g., using multithreading to communicate with each DCN, etc.) application updating becomes increasingly unfeasible.

As disclosed in detail below, a cloud administrator and/or a developer may, via a user interface, create version control tasks to be performed by agents installed on DCNs in the cloud environment. In examples disclosed herein, a message broker and collector(s) are deployed to manage the version control tasks so that target DCNs process the version control tasks in parallel. The message broker and the collector(s) are sometimes referred to as "middleware" because the message broker and the collector(s) facilitate communication between the administrator and/or a developer and the DCNs. Example version control tasks include a task requesting the version of one or more applications executing on a DCN and/or a task requesting one or more the applications be updated, etc. The user interface may also allow the cloud administrator and/or a developer to view the applications running on DCNs in the cloud environment and to view the latest known application version (e.g., updated after a version control task is performed to obtain application versions).

As disclosed in detail below, to manage application updates in a dynamic cloud environment, example message brokers and example collectors may be loosely coupled to control the flow of version control tasks requested by the cloud administrator and/or developer. In some examples used herein, loosely coupled communication refers to asynchronous communication where the message broker(s) and the collector(s) execute independently of each other (e.g., a change in how a message broker handles a version control task does not change how a collector in the collector bank handles the version control task and vice versa).

An example message broker maintains queues to manage version control tasks received from the administrator and/or developer, sent to and/or received from the collector bank(s), and/or sent (e.g., directly or indirectly) to the DCNs. The example message broker also maintains a queue for version control responses received from the DCNs. Example version control responses include responses received as a result of a version control task and messages proactively generated by agents executing on the DCNs. In some examples, the message broker(s) and the collector bank(s) have a many-to-many communication relationship (e.g., all message brokers are in communication with all collector banks). In such examples, the message broker may maintain a single queue for version control tasks and a single queue for the version control responses regardless of the number of collector banks the connected to the message broker. In addition, the example message broker may maintain a queue for each DCN connected to the example message broker.

As disclosed in detail below, an example collector bank executes one or more example collectors to process version control tasks based on rules and/or policies set by the administrator and/or developer. In some examples, a collector signals (e.g., notifies the message broker) when it is available to process a version control task or a version control response. Upon receiving a version control task, the example collector determines which DCN(s) is/are to receive the version control task and generates a targeted version control task. In some examples, to generate the targeted control task, the controller attaches routing key(s) to the version control task. In some examples, the DCN(s) to receive the version control task may be specified in the version control task. For example, an administrator and/or a developer may specify a particular DCN and/or a particular group of DCNs to execute the version control task. Additionally or alternatively, the example collector may determine, based on policies specified by the administrator and/or developer, which DCNs are to execute the version control task. In some examples, policies may be based on the criticality of an application update, a tune required to apply the application update, the criticality of a particular DCN, etc. For example, a policy may state that certain DCNs are to receive only critical updates (e.g., critical applications that should not be interrupted often, etc.).

In some examples, the collector bank dynamically manages the collectors in the collector bank. From time to time, the example message broker may request that an additional collector be deployed or that an existing collector be terminated. For example, if the lengths of the version control task queue and the version control response queue maintained by the message broker satisfy (e.g., are greater than or equal to) a threshold for a period of time, the example message broker may request that an additional collector be deployed. As another example, if the version control task queue and the version control response queue maintained by the example message broker are empty or nearly empty for a period of time, the example message broker may request that a collector be terminated. In some examples, the period of time may be measured in computer cycles. In some examples, the collector bank may proactively deploy and/or terminate collectors. For example, the collector bank may terminate a collector if the cumulative idle cycle time of the collectors satisfies (e.g., is greater than or equal to) a threshold.

As discussed in further detail below, DCNs include an agent to respond to version control tasks. In some examples, the agent is executed in the DCN (e.g., as an application in the DCN, etc.). Additionally or alternatively, the agent may be executed separate from the DCN, but having sufficient permissions to process the version control tasks related to the DCN. A version control task may request the version of a particular application installed on the DCN or may request the versions of one or more of the applications installed on the DCN (e.g., a container may have a single application while a VM may have multiple applications installed). In response to the version control task requesting the version(s) of application(s) installed on the DCN, the example agent sends a version control response to the message broker containing the installed version of one or more applications. Additionally, the example version control task may request that a particular application be updated. In response to such requests, the example agent retrieves and/or requests the appropriate file(s) from an application repository that stored application updates and patches. The example agent then attempts to install the update and sends a version control response to the message broker (e.g., whether the update was successfully installed or not, etc.). In some examples, the version control response may contain other statistics, such as install time and/or available space for future updates, etc.

As used herein, DCNs include non-virtualized physical hosts, virtual machines (VM), containers that run on top of a host operating system without the need for a hypervisor or separate operating system, and hypervisor kernel network interface modules. In some examples, a DCN may be referred to as a data computer end node or as an addressable node. VMs operate with their own guest operating system on a host using resources of the host virtualized by virtualization software (e.g., a hypervisor, virtual machine monitor, etc.). Numerous VMs can run on a single computer of processor system in a logically separate manner from one another. A VM can execute instances of applications or programs separate from application/program instances executed by other VMs on the same computer. In examples disclosed herein, containers are constructs that run on top of a host operating system without the need for a hypervisor or a separate guest operating system. Like VMs, containers are also logically separate from one another, and numerous containers can run on a single computer of processor system. Also like VMs, a container can execute instances of applications or programs separate from application/program instances executed by the other containers on the same computer or processor system. In some examples, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. In some examples, such containers are more lightweight than VMs. In some examples disclosed herein, a hypervisor kernel network interface module is a non-VM DCN that includes a network stack with a hypervisor kernel network interface and receive/transmit threads. Example of a hypervisor kernel network interface module include the vmknic module that is part of the ESXi™ hypervisor provided by VMware, Inc.

As used herein, the term "deployment environment" refers to a computing environment in a cloud platform provider (also referred to herein as a "cloud provider"). For example, separate deployment environments may be used for development, testing, staging, and/or production. An example cloud provider can have one or multiple deployment environments.

FIG. 1 is a block diagram of an example system 100 to manage applications installed on target DCNs 102 in a deployment environment 104. The target DCNs 102 may include non-virtualized physical hosts, virtual machines (VM), containers (e.g., Docker® containers, etc.), hypervisor kernel network interface modules, etc. The example system 100 includes an example message broker 106 and an example collector bank 108. The example message broker 106 and the example collector bank 108 may be used to retrieve information (e.g., version, install space, installation metrics, etc.) about applications and/or may be used to install updates to applications installed on target DCNs 102 deployed in the deployment environment 104. The system 100 of the illustrated example also includes an example application repository 110 to maintain application updates and patches, an example version control database 112 to store application information retrieved from the target DCNs 102, and an example user interface (UI) 114 to allow an administrator 116 and/or a developer 118 to create version control tasks and view information stored in the example version control database 112.

Because the example deployment environment 104 is dynamic (e.g., the target DCNs 102 are being deployed and/or terminated as necessary to suit the needs of the example deployment environment, etc.) and/or the example deployment environment 104 potentially includes a large number of example target DCNs 102, the example system 100 allows the administrator 116 and/or the developer 118 to manage applications installed on the target DCNs 102 without requiring them to create a separate version control task for each target DCN 102. Additionally, because the deployment environment 104 may contain different types of target DCNs 102 (e.g. non-virtualized physical hosts, VMs, containers, etc.) and/or because different DCNs 102 can use different communication protocols, the example system 100 allows the example deployment environment 104 to scale and/or be diverse without increasing complexity for the administrator 116 and/or the developer 118.

In the illustrated example of FIG. 1, the version control database 112 may store information related to applications installed on the target DCNs 102 in the deployment environment 104. For example, the version control database 112 may include DCN identifiers (IDs) corresponding to the target DCNs 102, the applications installed on the target DCNs 102, the versions of the applications installed on the target DCNs 102, historical information regarding past version control tasks and/or version control responses, and/or other information (e.g., the install time of the last update, available resources, criticality of the target DCN 102, etc.) that may be used to manage the applications in the deployment environment 104, etc. In some examples, the version control database 112 may be any data structure suitable for storing data, such as a relational database (e.g., a MySQL database, etc.) or an Extensible Markup Language (XML) file, etc. Example collectors 120 in the example collector bank 108 store information received from the example target DCNs 102 in the example version control database 112.

The administrator 116 and/or the developer 118 use the example UI 114 to create version control tasks to be executed by one or more target DCNs 102. An example version control task includes requesting the version of one or more applications installed on the target DCNs 102. Another example version control task includes requesting that an application update be installed on the target DCNs 102. In some examples, when creating a version control task, the administrator 116 and/or developer 118 specifies one or more rules to be used to determine which target DCNs 102 are to receive the version control task. For example, the administrator 116 and/or developer 118 may specify an application to update, a group of target DCNs 102 to update, and/or a type of target DCN 102 to update, etc. The example UI 114 may present the information stored in the example version control database 112 to the administrator 116 and/or the developer 118 to facilitate generating the version control tasks. In some examples, the UI 114 also facilitates the administrator 116 and/or the developer 118 to generate version control policies. For example, a policy may state that target DCNs 102 that have been designated as critical only are to receive critical updates and/or are only to receive updates after a backup target DCN 102 is deployed.

The example message broker 106 maintains an example task queue 122, an example response queue 124, and example target queues 126. In the illustrated example, the task queue 122, the response queue 124, and the target queue(s) 126 operate to manage the flow of the version control tasks and version control responses. In the illustrated example, the message broker 106 places version control tasks received or retrieved from the UI 114 on the task queue 122. In some examples, a collector 120 retrieves a version control task from the task queue 122 when the collector 120 is available to process a version control task. Additionally or alternatively, a collector 120 may signal (e.g., notify the message broker 106) that it is available, and the message broker 106 may send a version control task from the task queue 122 to the available collector 120. In some examples, the message broker 106 places new version control tasks at the end of the task queue 122 so that the task queue 122 can provide the version control tasks on a first-in-first-out basis. In some examples, the message broker 106 assigns corresponding priority levels (e.g. based on the criticality of the update, etc.) to the version control tasks. In some such examples, the task queue 122 provide version control tasks in order of their assigned priority.

In some examples, the message broker 106 includes a plugin manager which allows the message broker 106 to be integrated into diverse deployment environments 104. For example, through the plugin manager, communication capabilities (e.g., message formats, communication protocols, etc.) can be added to message broker 106 so the message broker 106 can communicate with particular target DCNs 106 and/or customized UIs 114. In some such examples, the plugin manager provides an interface that allows administrators 116 and/or developers 118 to add functionality to the message broker 106 without modifying the message broker 106 and/or understanding the underlying functionality of the message broker 106.

In the illustrated example of FIG. 1, the collectors 120 process the version control tasks obtained from the task queue 122. The example collectors 120 assign routing key(s) to the version control tasks. The routing key(s) specify which target DCN(s) 102 is/are to receive particular version control tasks. In some examples, the particular target DCN(s) 102 and/or a particular group of the target DCNs 102 are specified by the version control task. Additionally or alternatively, the example collectors 120 may assign routing key(s) based on a policy defined by the administrator 116 and/or the developer 118. For example, a policy may specify that, when a collector 120 receives a version control task requesting that an application be updated, all of the target DCN(s) 102 with that application installed are to receive the version control task. In some examples, the collectors 120 access the version control database 112 to determine which of the target DCN(s) 102 is/are to receive a version control task. In some examples, a collector 120 parses the version control task according to particular requirements of the target DCN(s) 102. In some examples, the collector 120 records in the version control database 112 that the version control task is to be sent to ones of the target DCN(s) 102 associated with the routing key(s).

The example system 100 may include one or more example collector banks 108 to manage corresponding example collectors 120. In some examples, the message broker 106 and the collector bank(s) 108 are loosely coupled in a many-to-many configuration. In such examples, because the message broker 106 and the collector bank(s) 108 are loosely coupled, the message broker 106 and the collector bank(s) 108 asynchronously communicate without knowledge of how recipient will process the communications. Being loosely coupled facilitates interchangeability (e.g., the configuration of the message broker 106 and/or the collector bank(s) 108 can change without affecting how the two communicated with each other). In such examples, because the message broker 106 and the collector bank(s) 108 are coupled in a many-to-many configuration, a message broker 106 may be in communication with multiple collector banks 108, and vice versa. In the illustrated example, the collector bank 108 dynamically deploys and/or terminated collectors 120 to balance resource usage (e.g., more collectors 120 require more computing resources, etc.) and task queue length (e.g., more collectors 120 will process the queues faster, etc.). In some examples, the collector bank 108 may terminate a collector 120 when the accumulative idle time for the collectors 120 in the collector bank 108 satisfies (e.g., is greater than or equal to) a threshold for a duration. In such examples, accumulative idle times are calculated for the collectors 120 in the collector bank 108 because as version control tasks become available, some collector 120 may remain idle while other collectors 120 process the new version control tasks. So, while any one collector 120 in the collector bank 108 may not remain idle for a long period of time, collectively, collectors 120 may be idle enough to justify terminating one or more collectors 120. Additionally or alternatively, the example message broker 106 may request that a collector 120 be terminated. For example, the message broker 106 may make such a request when the task queue 122 and/or the response queue 124 remain below a threshold length (or threshold sire) for a threshold period of time (e.g., a threshold duration defined by the administrator 116 and/or the developer 118). In some examples, the message broker 106 may request that an additional collector 120 be deployed when the accumulated length of task queue 122 and/or the response queue 124 remains above a threshold length (or threshold size) for a threshold period of time (e.g., a threshold duration defined by the administrator 116 and/or the developer 118). In some examples, the threshold period of time is based on, for example, the average time for a collector 120 to process a version control task or a version control response and the time required to deploy or terminate a collector 120.

In the illustrated example of FIG. 1, the collectors 120 send the version control tasks with routing key(s) to an exchange 128 within the message broker 106. The example exchange 128 sends (e.g., directly or indirectly) the targeted version control task to one or more target queues 126. In some examples, the example exchange 128 places the targeted version control tasks on the target queue(s) 126 corresponding to the routing key(s) included with the targeted version control tasks. Alternatively, in some examples, the exchange 128 broadcasts the targeted version control tasks and the target queues 126 etiquette the version control tasks with the corresponding routing key. In either case, enqueuing a version control tasks in association with a corresponding routing key in a target queue 126 facilitates communicating the version control tasks to the target DCNs 102 without requiring the collectors 108 to know how to communicate with the target DCNs 102.

In the illustrated example, the message broker 106 manages the target queues 126. In some examples, when a target DCN 102 is added to the development environment 104, the message broker 106 binds a target queue 126 (e.g., instantiates a corresponding target queue 126 and assigns a routing key, etc.) to the newly added target DCN 102. In some examples, when a target DCN 102 is removed from the development environment 104, the message broker 106 unbinds the target queue 126 (e.g., terminates the corresponding target queue 126 and unassigns the corresponding routing key, etc.) associated with the removed DCN 102. In some examples, the message broker 106 implements the Advanced Message Queuing Protocol (AMQP) (e.g., as implemented by RabbitMQ™ of Pivotal® Software, Inc.) to manager the target queues 126.

The example target DCNs 102 receive version control tasks from their corresponding target queues 126. In the illustrated example, an example agent 130 running on a corresponding target DCN 102 executes the version control task and generates a version control response to be sent to the message broker 106. In some examples, the agent 130 sends the version control response directly to the message broker 106. Alternatively, the example agent 130 broadcasts the version control response, which is then received by the example message broker 106. If the version control task requests the version(s) of application(s) installed on the target DCN 102, the example agent 130 collects the requested version information to generate the version control response. If the version control task requests that an application installed on the target DCN 102 be updated, the example agent 130 retrieves the software update from the example update repository 110, attempts to install the update, and generates the version control response to report the status of the update (e.g., whether the update was successful or failed). In such a manner, the example target DCNs 102 in the example deployment environment 104 process version control tasks in parallel, saving time and efficiently managing a large number of target DCNs 102. Additionally, because the example target DCNs 102 send version control responses are asynchronously, the example message broker 106 and/or the example collector bank(s) 108 manage resources independently of the example target DCNs 102.

In some examples the agent 130 is idle when there are no version control tasks in the corresponding target queue 126. In such examples, the agent 130 wakes up from the idle state when a version control task is enqueued in the corresponding target queue 126. In some examples, the agent 130 pulls the version control task from the corresponding target queue 126. The example agent 130 then executes the version control task, and sends the version control response to the message broker 106. Alternatively or additionally, the example message broker 106 pushes the version control task to the example agent 130. If another version control task is not pending in the corresponding target queue 130 after the example agent finishes servicing a current version control task, the example agent 130 returns to the idle state. Additionally, in some examples, the agent 130 may, from time to time (e.g., at set intervals, at a set time and/or date, etc.), wake up from the idle state. The example agent 130 then collects version information of applications installed on the corresponding target DCN 102 and generates a version control response. In some examples, the agent 130 compares the version information to application updates in the repository 110 and includes whether an update to an application on the target DCN 102 exists within the repository 110. In some such examples, the agent 130 also includes whether an update is a critical update (e.g., as indicated by information associated with the application update). The example agent 130 sends the version control response to the message broker 106, and then returns to the idle state. In some examples, the example agent 130 may be scheduled to wake up during historic periods of low activity. In such a manner, the agent 130 proactively reports the application versions to the message broker 106. Proactively reporting application versions substantially reduces or eliminates the need for an administrator 116 and/or a developer 118 to generate version control tasks to request such version information.

In the illustrated example of FIG. 1, the message broker 106 receives the version control responses from the target DCNs 102 and places the version control responses on the response queue 124. When an example collector 120 notifies the example message broker 106 that it is available, the example message broker 106 may send a version control response to the available collector 120 via the response queue 124. The example collector 120 processes the version control response and updates the example version control database 112. If a version control task is on the task queue 122 and a version control response is on the response queue 124 when an example collector 120 signals that it is available, the example message broker 106 employs an arbitration policy to determine which of the version control task or the version control response to send to the available collector 120. For example, the arbitration policy may prioritize the task queue 122 over the response queue 124 (or vice versa) based on an objective to communicated version control tasks to the target DCNs 102 as quickly as possible. As another example, the arbitration policy may select the queue with the longest length or may alternate between the task queue 122 and the response queue 124.

Figure 2:
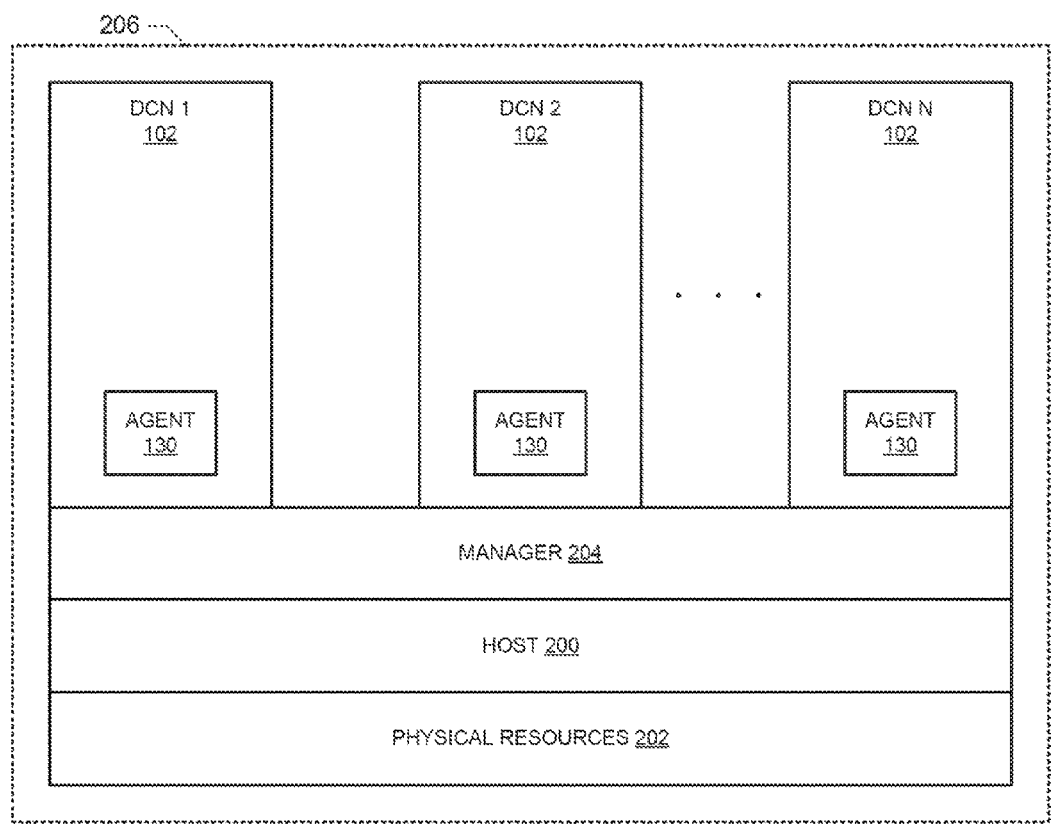
FIG. 2 is a block diagram of an example data compute node that may execute applications to be managed by the example system of FIG. 1.

FIG. 2 is a block diagram of example physical machine 206 within the development environment 104 (FIG. 1) that may execute DCNs (e.g., the target DCNs 102 of FIG. 1) to be managed by the system 100 of FIG. 1. The example deployment environment 104 of FIG. 1 may contain one or more physical machines 206. In the illustrated example, a host 200 manages physical resources 202 (e.g., processor(s), memory, storage, peripheral devices, network access, etc.) o the physical machine 206. The example host 200 is a native operating system (OS) executing on the physical resources 202. In some examples, the host 200 executes a manager 204. In some such examples, the manager 204 is a virtual machine manager (VMM) that creates virtualized hardware (e.g., virtualized storage, virtualized memory, virtualized processors(s), etc.). In some examples, the manager 204 is a container engine that enforces isolation of physical resources 202 and isolation of the host 200 to separate nodes 206 executing within the same host 200. Isolation means that the container engine manages containers executing instances of applications or programs separate from application/program instances executed by the other containers on the same physical machine 206.

In the illustrated example of FIG. 2, the target DCNs 102 execute within the environment managed by the manager 204. In some examples, a target DCN 102 is a VM executing a guest OS (e.g., a Windows operating system, a Linux operating system, etc.) that accesses virtualized hardware created by the manager 204 (e.g., a VMM, etc.). In some such examples, target DCN 102 may execute multiple applications and services. Alternatively, a target DCN 102 is a container. In some such examples, target DCN 102 is isolated (e.g. via name spaces, etc.) by the manager 204 (e.g., a container engine, etc.) from other nodes 206 executing on the same physical recourses 202. Typically, such container-based target DCN 102 execute a single application or service and do not execute a guest OS.

In the illustrated example, the nodes 206 have corresponding agents 130 to execute version control tasks and/or proactively generate version control responses. The example agents 130 are configured with the permissions required to monitor the application versions installed on corresponding target DCNs 102 and to install application updates to the target DCNs 102. The example agents 130 also are configured (e.g., provided with network location information, login credentials, etc.) to access the example update repository 110 (FIG. 1) to retrieve application updates. In some examples, the agents 130 execute directly on the node 206 (e.g., when the node 206 is a VM or non-virtualized physical machine, etc.). In some examples, the agents 130 execute as part of the manager 204 (e.g., when the node 206 is a container, etc.). In some examples, when an agent 130 is installed on a node 206, the agent 130 broadcasts a version control response including the version(s) of application(s) installed on the node 206 and/or identity information (e.g., network address, communication protocol, node type, etc.). In this manner, the example collectors 120 (FIG. 1) process the version control response to add the example node 206 to the example version control database 112 (FIG. 1).

While an example manner of implementing the system 100 of FIG. 1 is illustrated in FIGS. 1 and/or 2, one or more of the elements, processes and/or devices illustrated in FIGS. 1 and/or 2 may be combined, divided, re-arranged, omitted, eliminated and/or implemented in any other way. Further, the example message broker 106, the example collector bank 108, the example UI 114, the example agent 130, the example target nodes 102, the example host 200, the example manager 204, and/or, more generally, the example system 100 of FIG. 1 may be implemented by hardware, software, firmware and/or any combination of hardware, software and/or firmware. Thus, for example, any of the example message broker 106, the example collector bank 108, the example UI 114, the example agent 130, the example target nodes 102, the example host 200, the example manager 204, and/or, more generally, the example system 100 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example message broker 106, the example collector bank 108, the example UI 114, and/or the example agent 130, the example target nodes 102, the example host 200, the example manager 204, is/are hereby expressly defined to include a tangible computer readable storage device or storage disk such as a memory, a digital versatile disk (DVD), a compact disk (CD), a Blu-ray disk, etc. storing the software and/or firmware. Further still, the example system 100 of FIG. 1 may include one or more elements, processes and/or devices in addition to, or instead of, those illustrated in FIGS. 1 and/or 2, and/or may include more than one of any or all of the illustrated elements, processes and devices.

Figure 3:
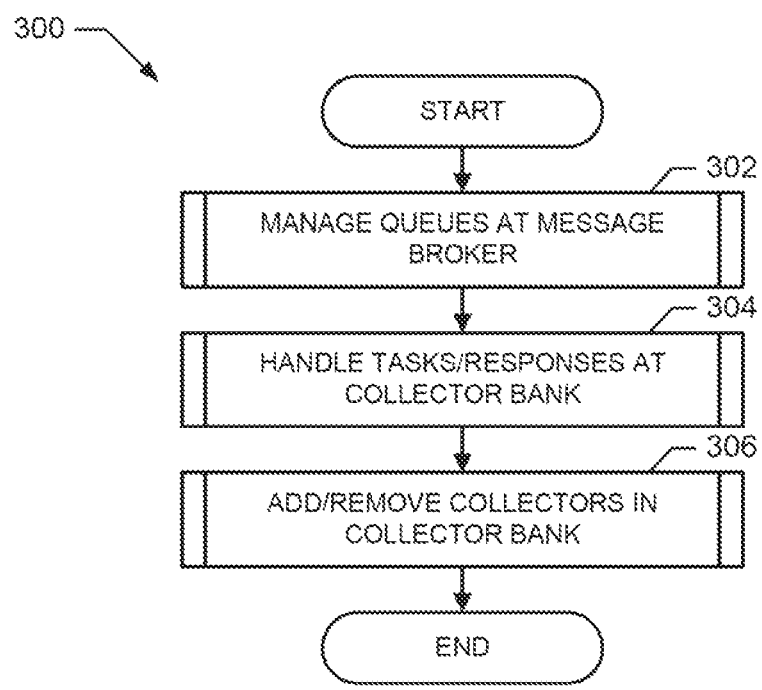
FIG. 3 is a flowchart representative of example machine readable instructions that may be executed to implement the example system of FIG. 1 to manage application updates of the data compute nodes.
Figure 4:
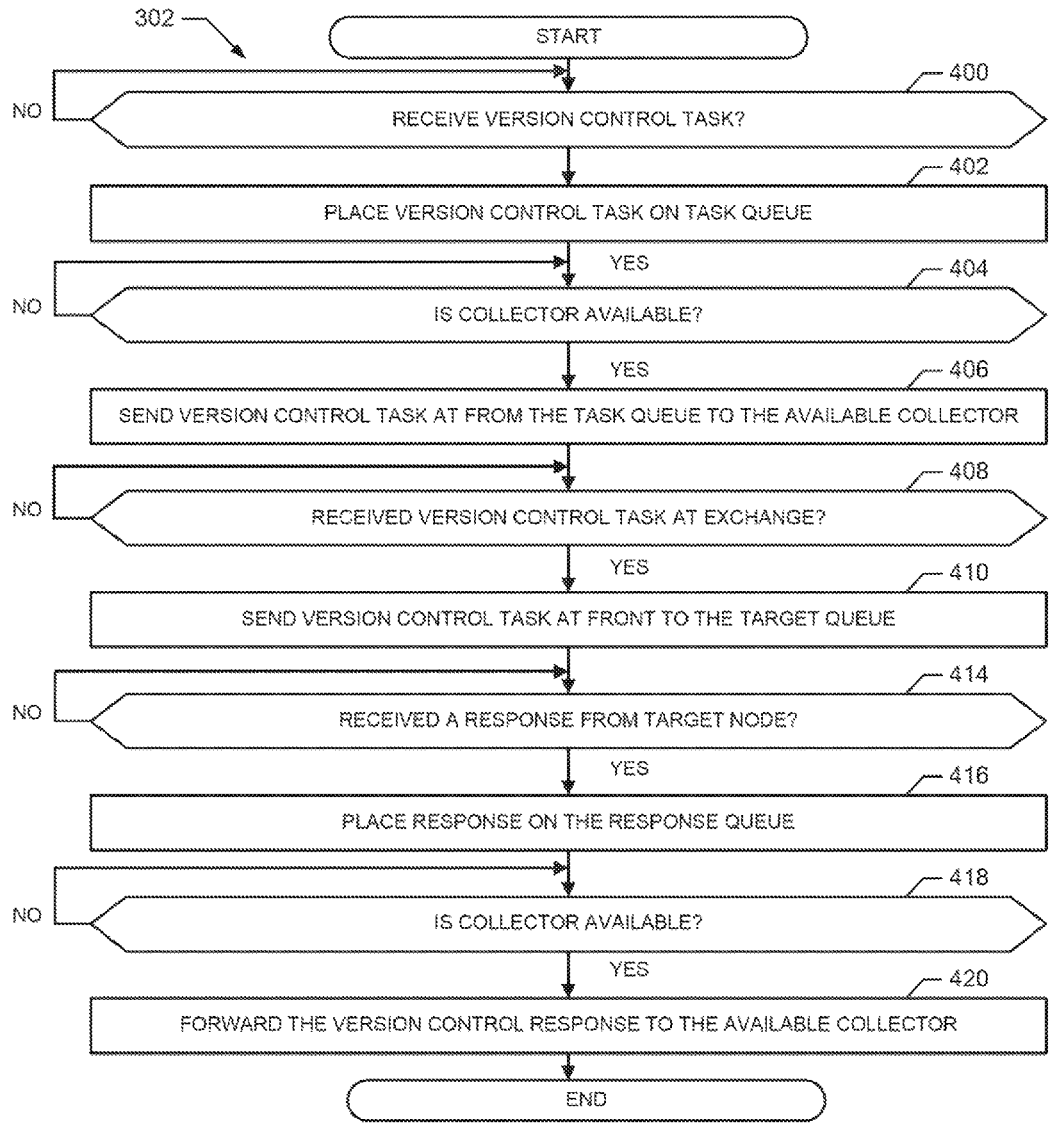
FIG. 4 is a flowchart representative of example machine readable instructions that may be executed to implement the example message broker of FIG. 1 to manage tasks.
Figure 5:
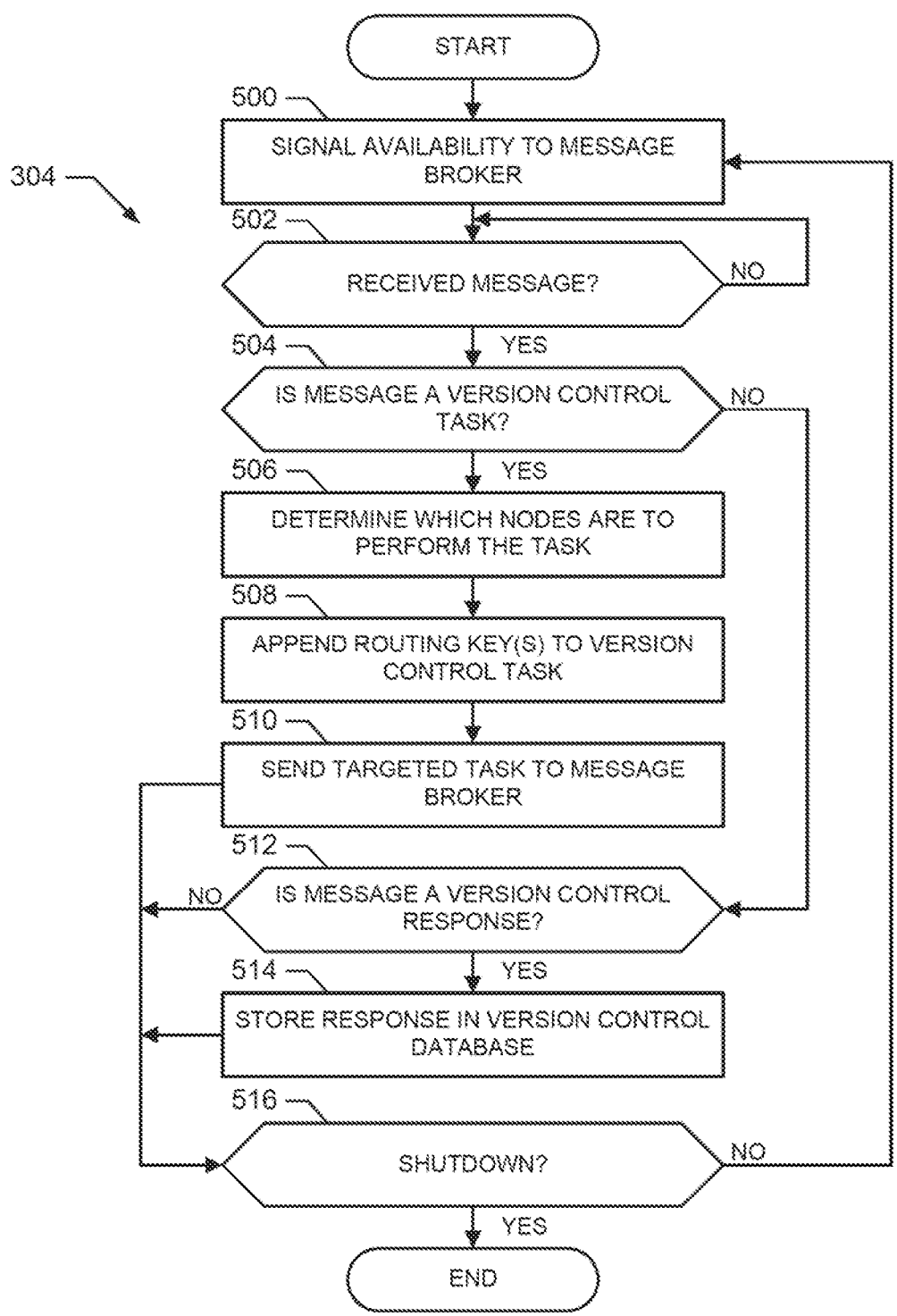
FIG. 5 is a flowchart representative of example machine readable instructions that may be executed to implement the example collector of FIG. 1 to process tasks and responses from the example message broker of FIG. 1.

A flowchart representative of example machine readable instructions for implementing the example system 100 of FIG. 1 is shown in FIG. 3. Flowcharts representative of example machine readable instructions for implementing the example message broker 106 of FIG. 1 are shown in FIGS. 4 and/or 6. A flowchart representative of example machine readable instructions for implementing the example collectors 120 of FIG. 1 is shown in FIG. 5. A flowchart representative of example machine readable instructions for implementing the example agent 130 of FIG. 1 is shown in FIG. 7. In these examples, the machine readable instructions comprise one or more programs for execution by a processor such as the processor 812 shown in the example processor platform 800 discussed below in connection with FIG. 8. The program(s) may be embodied in software stored on a tangible computer readable storage medium such as a CD-ROM, a floppy disk, a hard drive, a digital versatile disk (DVD), a Blu-ray disk, or a memory associated with the processor 812, but the entirety of the program(s) and/or parts thereof could alternatively be executed by a device other than the processor 812 and/or embodied in firmware or dedicated hardware. Further, although the example programs are described with reference to the flowcharts illustrated in FIGS. 3, 4, 5, 6 and/or 7, many other methods of implementing the example system 100, the example message broker 106, the example agents 130, and/or the example collectors 120 may alternatively be used. For example, the order of execution of the blocks may be changed, and/or some of the blocks described may be changed, eliminated, or combined.

As mentioned above, the example processes of FIGS. 3, 4, 5, 6 and/or 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3, 4, 5, 6 and/or 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is a flowchart representative of example machine readable instructions 300 which may be executed to implement the example system 100 of FIG. 1 to manage updates of applications installed on target DCNs 102 (FIG. 1) in the example deployment environment 104 (FIG. 1). Initially, at block 302, the example message broker 106 manages queues (e.g., the example task queue 122, the example response queue 124, and/or the example target queues 126 of FIG. 1). For example, the message broker 106 of FIG. 1 maintains the example task queue 122 to manage version control tasks between the example UI 114 (FIG. 1) and the example collectors 120 (FIG. 1). The example message broker 106 also maintains the example response queue to manage version control responses between the example agents 130 (FIG. 1) installed on the example DCNs 102 and the example collectors 120. The example message broker 106 maintains the example target queues 126 to manage targeted version control tasks between the example collectors 120 and the example DCNs 102. An example process that may be used to implement block 302 is described below in connection with FIG. 4.

At block 304, the example collector bank 108 handles version control tasks and version control responses. For example, the example collectors 120 in the example collector bank 108 of FIG. 1 process version control tasks, via the example task queue 122, to assign routing keys to the version control tasks. The routing keys assigned by the example collectors 120 correspond to target DCNs 102 that are to execute the version control task. In some examples, the collectors 120 parse the version control tasks according to the particular requirements of the target DCN(s) 102. The example collectors 120 process version control responses, via the example response queue 124, to update the example version control database 112 (FIG. 1). An example process that may be used to implement block 304 is described below in connection with FIG. 5.

At block 306, the example message broker 106 may request to add or remove a collector 120 to the collector bank 108. In some examples, as described above, whether to request a change in the number of collectors 120 in the collector bank 108 is based on the lengths (or sizes) of the task queue 124 and the response queue 122. An example process that may be used to implement block 306 is described below in connection with FIG. 6. The example program 300 then ends.

FIG. 4 is a flowchart representative of example machine readable instructions 302 which may be executed to implement the example message broker 106 of FIG. 1 to manage the flow of messages (e.g., version control tasks and/or version control responses, etc.) between the example UI 114 (FIG. 1), the example collectors 120 (FIG. 1) and/or the example target DCNs 102 (FIG. 1). Initially, at block 400, the example message broker 106 determines whether a version control task has been received from the UI 114. If the example message broker 106 has receives a version control task, program control advances to block 402. Otherwise, if the example message broker 106 has not received a version control task, program control returns to block 400. At block 402, the example message broker 106 places the version control task on the example task queue 122 (FIG. 1). In some examples, the message broker 106 places the version control task at the end of the task queue 122. Alternatively, when the example task queue 122 is organized by priority, the example message broker 106 may place the version control task in priority order on the task queue 122.

At block 404, the example message broker 106 determines whether an example collector 120 in example the collector bank 108 (FIG. 1) is available. In some examples, a collector 120 will signal (e.g., send a message to the message broker, broadcast a message, etc.) when it is available to process a version control task or version control response. If an example collector 120 is available, program control advances to block 406. Otherwise, if an example collector 120 is not available, program control returns to block 404. At block 406, the example message broker 106 sends a version control task on the example task queue 122 to the available example collector 120. At block 408, the example exchange 128 (FIG. 1) of the example message broker 106 determines whether a targeted version control task has been received from one of the example collectors 120 in the example collector bank 108. If a targeted version control task has been received, program control advances to block 410. Otherwise, if a targeted version control task has not been received, program control returns to block 408.

At block 410, the exchange 128 sends (e.g., directly or indirectly) the version control task to example target queue(s) 126 of the example target DCN(s) 102. In some examples, the exchange 128 broadcasts the target version control task to be selectively enqueued by the example target queue(s) 126 corresponding to one or more routing key(s) assigned to the version control task. At block 414, the example message broker 106 determines whether a version control response has been received from a target DCN 102. If the example message broker 106 has received a version control response, program control advances to block 416. Otherwise, if the example message broker 106 has not received a version control response, program control returns to block 414. At block 416, the example message broker 106 places the version control response on the example response queue 124.

At block 418, the example message broker 106 determines whether an example collector 120 in the example collector bank 108 is available. If a collector 120 is available, program control advances to block 420. Otherwise, if a collector 120 is not available, program control returns to block 418. At block 420, the example message broker 106 sends the version control response at the front of the example response queue 124 to the available example collector 120 to be processed as described in connection with FIG. 5 below. The example program 302 then ends.

FIG. 5 is a flowchart representative of example machine readable instructions 304 that may be executed to implement the example collectors 120 of FIG. 1 to process version control tasks and version control responses from the example message broker 106 (FIG. 1). Initially, at block 500, the example collector 120 signals to the example message broker 106 that it is available. At block 502, the example collector determines whether a message (e.g., a version control task or a version control response, etc.) has been received from the example message broker 106 in response to signaling that it is ready at block 500. If a message has been received, program control advances to block 504. Otherwise, if a message has not been received, program control returns to block 502.

At block 504, the example controller 120 determines whether the received message is a version control task. If the message is a version control task, program control advances to block 506. Otherwise, if the message is not a version control task, program control advances to block 512. At block 506, the example collector determines which of the target DCN(s) 102 (FIG. 1) is/are to perform the version control task. In some examples, the collector 120 determines which of the target DCN(s) 102 is/are to perform the version control task based on a rule included in the version control task. For example, a version control task may include a rule that states that all target DCNs 102 with MySQL 5.5 installed are to update to MySQL 5.6, and as such, the collector 120 is to determine which of the target DCNs 102 in the deployment environment have MySQL 5.5. As another example, the a version control task may include a rule that states that one or more of the target DCNs 102 in a certain group (e.g., one or more target DCNs 102 defined by an administrator 116 and/or a developer 118 to be managed together, etc.) are to report the version numbers of the MySQL application installed on DCNs 102 in the group. Additionally or alternatively, in some examples, the administrator 116 and/or the developer 118 may define general rules and/or policies (e.g., via the UI 114) that define which of the target DCNs 102 are to execute which version control tasks. For example, a rule may state that if the version control task identifies an update as critical, all of the target DCNs 102 with that application installed are to execute that version control task. As another example, a rule may state that all DCNs 102 in the deployment environment 104 (FIG. 1) are to execute version control tasks that request application version numbers. In some examples, the collector 120 accesses the version control database 112 (FIG. 1) to determine which of the example target DCN(s) 102 satisfy the rule.

At block 508, the example collector 120 appends one or more routing key(s) corresponding to the example target DCN(s) 102 determined at block 506 to the version control task received at block 502. On some examples, the version control database 112 stores the routing keys to be retrieved by the collector 120. In some examples, the collector bank 108 may maintain a list of routing keys corresponding to the target DCNs 102 in the deployment environment 104 for use by the message broker 106 to route the version control task received at block 502 to the example target DCN(s) 102 determined at block 506. At block 510, the collector 120 sends the targeted version control task to the message broker 106. Program control then advances to block 516.

At block 512, the example collector 120 determines whether the message received at block 502 is a version control response. If the message is a version control response, program control advances to block 514. Otherwise, if the message is not a version control response, program control advances to block 516. At block 514, the example collector 120 stores the version control response in the example version control database 114. For example, the collector 120 stores the version control response in association with the example target DCN 102 that sent the version control response. Program control then advances to block 516. At block 516, the example collector 120 determines whether it has receive instructions from the example collector bank 108 to shutdown. If the example collector 120 has not receive instructions to shutdown, program control returns to block 500. Otherwise, if the example collector 120 has received instructions to shutdown, the example program 304 ends.

Figure 6:
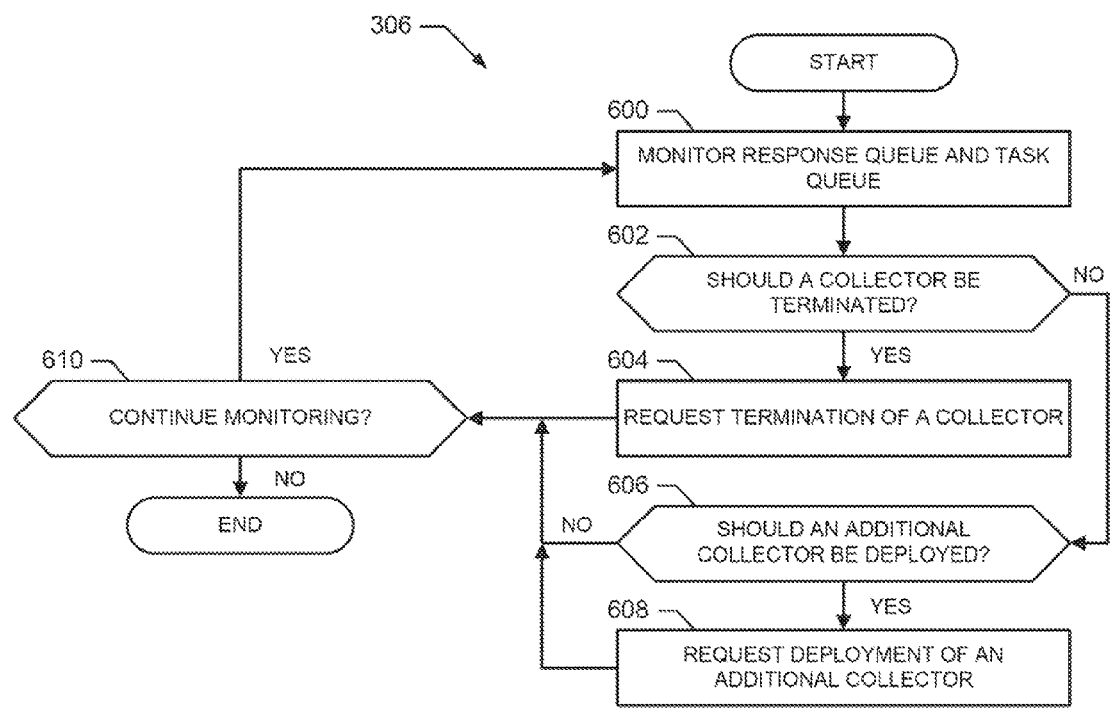
FIG. 6 is a flowchart representative of example machine readable instructions that may be executed to implement the example message broker of FIG. 1 to request that the example collector bank of FIG. 1 deploy an additional collector or terminate an existing collector.
Figure 7:
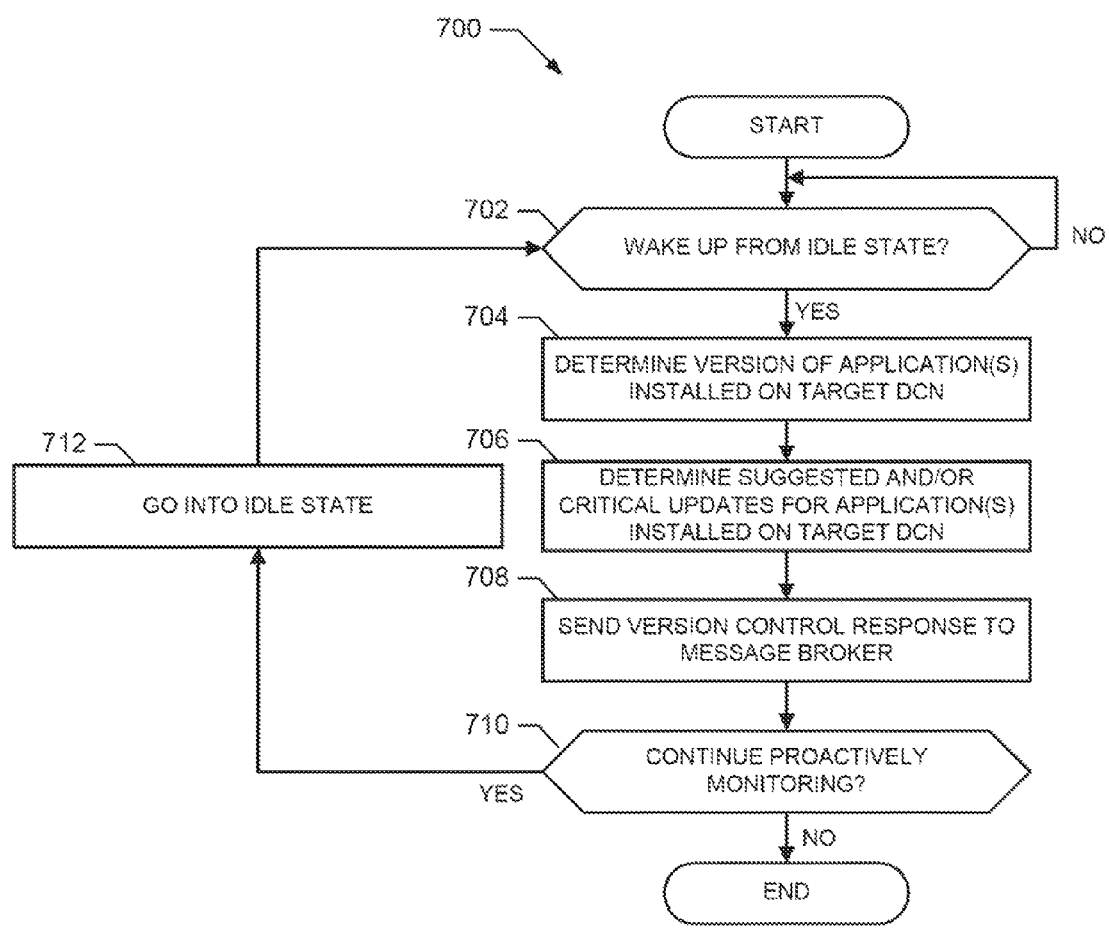
FIG. 7 is a flowchart representative of example machine readable instructions that may be executed to implement the example agents of FIG. 1 to proactively send version control responses to the message broker of FIG. 1.

FIG. 6 is a flowchart representative of example machine readable instructions 306 that may be executed to implement the example message broker 106 of FIG. 1 to request that the collector bank 108 (FIG. 1) deploy an addition collector 120 (FIG. 1) or terminate an existing collector 120. Initially, at block 600, the example message broker 106 monitors the example task queue 122 (FIG. 1) and the example response queue 124 (FIG. 1). At block 602, the example message broker 106 determines whether a collector 120 should be terminated. In some examples, the message broker 106 determines that a collector 120 should be terminated if the accumulative length of the task queue 122 and the response queue 124 is below a minimum activity threshold for a set period of time (e.g., one computer cycle, ten computer cycles, one hundred computer cycles, one millisecond, ten milliseconds, etc.). In some examples, the example message broker 106 determines that an example collector 120 should be terminated if, when an example collector 120 signals that it is available, the example task queue 122 and the example response queue 124 are empty. If the example message broker 106 determines that an example collector 120 should be terminated, program control advances to block 604. Otherwise, if the example message broker 106 does not determine that an example collector 120 should be terminated, program control advances to block 606. At block 604, the example message broker 106 requests termination of one of the example collectors 120. For example, the message broker 106 sends a request to the example collector bank 108 to terminate a collector 120.

At block 606, the example message broker 106 determines whether an additional collector 120 should be deployed. In some examples, the example message broker 106 determines that an additional collector 120 should be deployed if either the task queue 122 or the response queue are full 124, or exceed a threshold queue length. In some examples, the message broker 106 determines that an additional collector 120 should be deployed if the accumulative lengths of the task queue 122 and the response queue 124 are above an activity threshold for a set period of time (e.g., a threshold duration). If the example message broker 106 determines that an additional collector 120 should be deployed, program control advances to block 608. Otherwise, if the example message broker 106 does not determine that an addition collector 120 should be deployed, program control advances to block 610. At block 608, the example message broker 106 requests deployment of an additional collector 120. For example, the example message broker 106 sends a request to the example collector bank 108 to deploy an additional collector 120. At block 610, the example message broker 106 determines whether to continue monitoring the example task queue 122 and the example response queue 124. If the message broker 106 is to continue monitoring the task queue 122 and the response queue 124, program control returns to block 600. Otherwise, if the message broker 106 is not to continue monitoring the task queue 122 and the response queue 124, the example program 306 ends.

FIG. 7 is a flowchart representative of example machine readable instructions 700 that may be executed to implement the example agents 130 of FIG. 1 to proactively send version control responses to the message broker 106 of FIG. 1. Initially, at block 702, the agent 130 determines, from time to time, whether it is to wake up from an idle state. The example agent 130 goes into an idle state when there are no version control tasks in the corresponding target queue 126 (FIG. 1). The example administrator 116 and/or example developer 118 (FIG. 1) schedule a time for the example agent 130 to wake up from the idle state. For example, the agent 130 may be scheduled to proactively check for application updates every Monday morning at 12:00 am. If the agent 130 determines it is to wake up from an idle state, program control advances to block 704. Otherwise, if the agent 130 determines it is not to wake up from an idle state, program control returns to block 702.

At block 704, the example agent 130 collects version information of applications installed on the corresponding target DCN 102. At block 706, the example agent 130 determines suggested and/or critical updates in the repository 110 for application(s) installed on the corresponding target DCN 102. The example agent 130 suggests updating any application installed on a corresponding target DCN 102 that has an update in the repository 110. In some examples, to determine whether there is an application update, the agent 130 requests version information of updates in the repository 110 corresponding to the applications installed on the target DCN 102. In some such examples, the agent 103 receives an indicated from the repository that a particular application update is critical. At block 708, the example agent 130 sends a proactive version control message to the example message broker 106 including the version control information collected at block 704, and the suggested and/or critical updates determined at block 706. The example proactive version control message is treated as a version control response by the example message broker 104 and the example collector 120. At block 710, the example agent 130 determines whether to continue to proactively monitor for application updates. If the example agent 130 is to continue to proactively monitor for application updates, program control advances to block 712. Otherwise, if the example agent 130 is not to continue proactively monitoring for application updates, program 700 ends. At block 712, the example agent 130 goes into the idle state until it is to wake up (at block 702).

Figure 8:
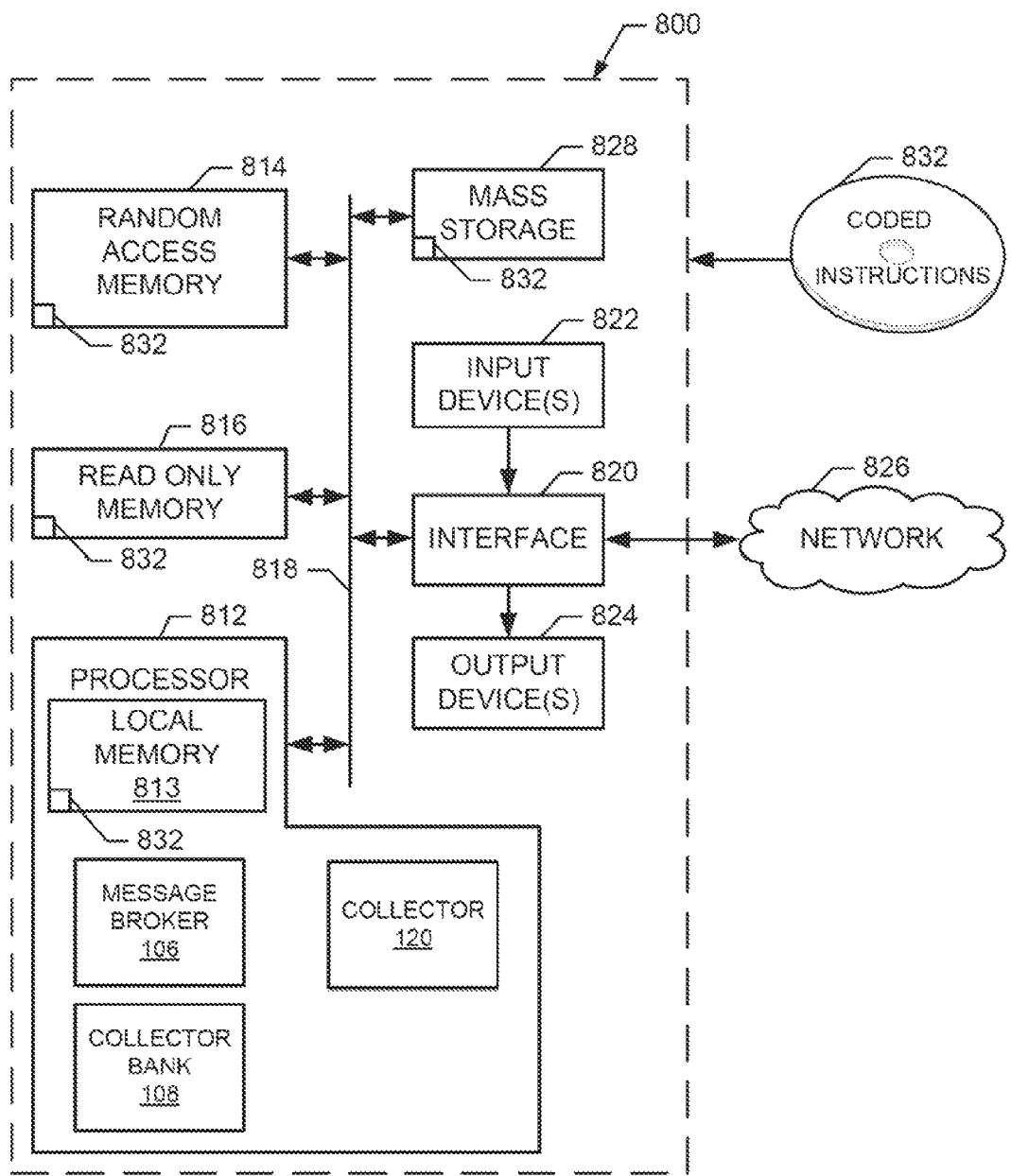
FIG. 8 is a block diagram of an example processor platform capable of executing the example instructions of FIGS. 3, 4, 5, 6, and/or 7 to implement the example system of FIG. 1.

FIG. 8 is a block diagram of an example processor platform 800 structured to execute the instructions of FIGS. 3, 4, 5, 6, and/or 7 to implement the system 100 of FIG. 1. The processor platform 800 can be, for example, a server, a personal computer, a workstation, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. In the illustrated example, the processor 812 includes an example message broker 106, an example collector bank 108, and an example collector 120. The example message broker 106, an example collector bank 108, and an example collector 120 may implemented by one more processors 812 on one or more processor platforms 800. For example, the example message broker 106, an example collector bank 108, and an example collector 120 may implemented on separate processor platforms 800 within a networked environment.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 3, 4, 5, 6, and/or 7 may be stored in the mass storage device 828, in the volatile memory 814, in the non-volatile memory 816, and/or on a removable tangible computer readable storage medium such as a CD or DVD.

Figure 9:
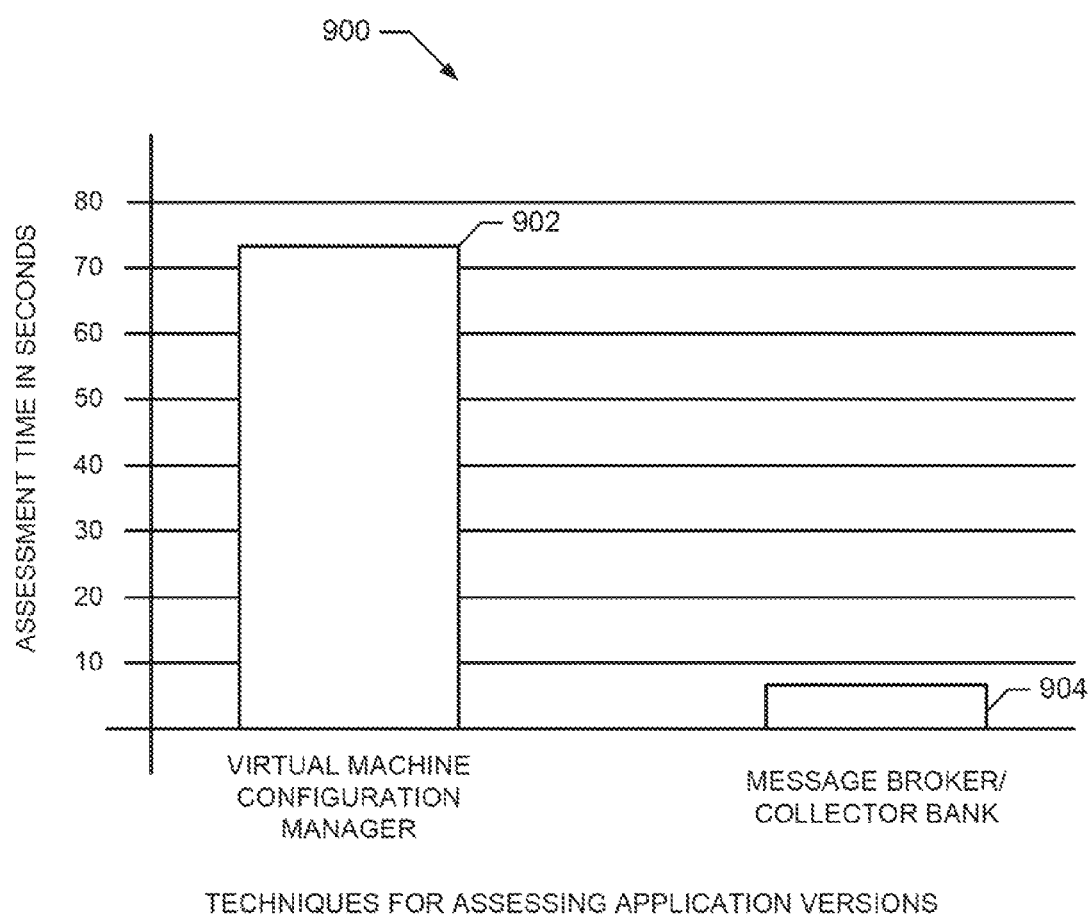
FIG. 9 is an example performance comparison graph 900 depicting a performance of the system 100 of FIG. 1 for determining versions of applications executing in a deployment environment (e.g., the deployment environment 104 of FIG. 1) relative to a virtual machine configuration manager.

FIG. 9 is an example performance comparison graph 900 depicting a performance of the system 100 of FIG. 1 for determining versions of applications executing in a deployment environment (e.g., the deployment environment 104 of FIG. 1) relative to a virtual machine configuration manager. The example performance comparison graph 900 depicts an example time 902 (in seconds) required for a prior virtual machine configuration manager to assess the version information of applications installed on DCNs in a deployment environment. A prior virtual machine configuration manager uses Secure Shell (SSH) in a loop and/or multithreading to communicate to DCNs. However, in a dynamic and scaling environment, using a prior virtual machine configuration manager is time and resource intensive. The example performance comparison graph 900 also depicts an example time 904 to assess DCNs in a similar deployment environment. As illustrated in FIG. 9, the example time 904 for the system 100 to assess the DCNs in the deployment environment is less than the example time 902 for the prior virtual machine configuration manager to assess the DCNs in the deployment environment.

From the foregoing, it will be appreciate that examples disclosed herein facilitate managing application updates in a dynamic cloud environment by allowing administrators and/or developers to efficiently managing application updates for a large number of data compute nodes. Moreover, because the examples disclosed herein facilitate tasks and responses to be processed in parallel, a large number of data computer nodes can be managed while achieving better performance (e.g., less computer cycles, less memory, etc.) and faster response times. In addition, it will be appreciate that examples disclosed herein dynamically respond to processing requirements, thus saving computing resources.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to manage application updates in a cloud environment, comprising:
    determining that a collector in a collector bank is available to process a version control task, the version control task to request an application version to manage an application update;
    sending the version control task from a task queue to the collector to determine which compute node is to execute the version control task;
    determining which compute node is to execute the version control task based on version information of applications installed on the compute nodes in the cloud environment;
    enqueuing the version control task on a target queue based on a routing key assigned to the task by the collector, the routing key to specify the compute node to execute the version control task;
    sending the version control task to the compute node associated with the target queue;
    determining an availability of the collector in the collector bank to process a response received from the compute node, the response to indicate a result of the version control task;
    sending the response from a response queue to the collector, the collector to process the response to update a version control database based on information in the response; and
    when a combination of a size of the task queue and a size of the response queue is greater than a threshold for a period of time, sending a request to the collector bank to add an additional collector to the collector bank.

2. The method as defined in claim 1, further including when the size of the task queue is greater than a threshold size for a threshold duration, sending a request to the collector bank to add an additional collector to the collector bank.

3. The method as defined in claim 1, further including when the size of the task queue is less than a threshold size for a threshold duration, sending a request to the collector bank to terminate an existing collector in the collector bank.

4. The method as defined in claim 1, further including when the combination of the size of the task queue and the size of the response queue is less than a threshold for a period of time, sending a request to the collector network to terminate an existing collector in the collector network.

5. The method as defined in claim 1, further including receiving the response in the response queue after the compute node at least one of (a) executes the version control task, or (b) proactively compares a version of an application executing on the compute node to a version of the application in an application repository.

6. A tangible computer readable storage medium comprising instructions which, when executed, cause at least one processor to:
    determine that a collector in a collector bank is available to process a version control task, the version control task to request an application version to manage an application update;
    send the version control task from a task queue to the collector;

determine which compute node is to execute the version control task based on version information of applications installed on the compute nodes in the cloud environment;

enqueue the version control task on a target queue based on a routing key assigned to the version control task by the collector, the routing key to specify the compute node to execute the version control task;

send the version control task to the compute node associated with the target queue;

determine an availability of the collector in the collector bank to process a response received from the compute node, the response to indicate a result of the version control task;

send the response from a response queue to the collector, the collector to process the response to update a version control database based on information in the response; and send a request to the collector bank to add an additional collector to the collector bank when a combination of a size of the task queue and a size of the response queue is greater than a threshold for a period of time.

7. The tangible computer readable storage medium as defined in claim 6, wherein the instructions, when executed, further cause the at least one processor to send a request to the collector bank to add an additional collector to the collector network when the size of the task queue is greater than a threshold size for a threshold duration.

8. The tangible computer readable storage medium as defined in claim 6, wherein the instructions, when executed, further cause the at least one processor to send a request to the collector bank to terminate an existing collector in the collector bank when the size of the task queue is less than a threshold size for a threshold duration.

9. The tangible computer readable storage medium as defined in claim 6, wherein the instructions, when executed, further cause the at least one processor to send a request to the collector bank to terminate an existing collector in the collector bank when the combination of the size of the task queue and the size of the response queue is less than a threshold size for a threshold duration.

10. The tangible computer readable storage medium as defined in claim 6, wherein the instructions, when executed, further cause the at least one processor to receive the response in the response queue after the compute node at least one of (a) executes the version control task, or (b) proactively compares a version of an application executing on the compute node to a version of the application in an application repository.

11. The tangible computer readable storage medium as defined in claim 6, wherein the compute node is at least one of a non-virtualized physical host, a virtual machine, or a container.

12. A system to manage application updates in a cloud environment, comprising:
  at least one processor; and
  memory comprising instructions that, when executed, cause the at least one processor to:
    determine that a collector in a collector bank is available to process a version control task, the version control task to request an application version to manage an application update;
    send the version control task from a task queue to the collector to determine which compute node is to execute the version control task;
    determine which compute node is to execute the version control task based on version information of applications installed on the compute nodes in the cloud environment;
    enqueue the version control task on a target queue based on a routing key assigned to the task by the collector, the routing key to specify the compute node to execute the version control task;
    send the version control task to the compute node associated with the target queue;
    determine an availability of the collector in the collector bank to process a response received from the compute node, the response to indicate a result of the version control task;
    send the response from a response queue to the collector, the collector to process the response to update a version control database based on information in the response; and
    when a combination of a size of the task queue and a size of the response queue is greater than a threshold for a period of time, send a request to the collector bank to add an additional collector to the collector bank.

13. The system as defined in claim 12, wherein the instructions, when executed, further cause the at least one processor to notify a message broker when the collector is available to process the version control task.

14. The system as defined in claim 13, wherein the instructions, when executed, further cause the at least one processor to send the version control task from the task queue to the collector in response to being notified by the collector.

15. The system as defined in claim 12, wherein the instructions, when executed, further cause the at least one processor to send the response from the response queue to the collector.

16. The system as defined in claim 12, wherein the instructions, when executed, further cause the at least one processor to terminate an existing collector in the collector bank when the size of the task queue is less than a threshold size for a threshold duration.

17. The system as defined in claim 12, wherein the instructions, when executed, further cause the at least one processor to send a request to the collector bank to deploy an additional collector in the collector bank when a length of the task queue satisfies a threshold size for a threshold duration.

18. The system as defined in claim 12, wherein the instructions, when executed, further cause the at least one processor to receive the response after the compute node at least one of (a) executes the version control task, or (b) proactively compares a version of an application executing on the compute node to a version of the application in an application repository.

19. The system as defined in claim 12, wherein the instructions, when executed, further cause the at least one processor to send a request to the collector bank to terminate an existing collector in the collector bank when a combination of the size of the task queue and the size of the response queue is less than a threshold size for a threshold duration.

20. The system as defined in claim 12, wherein the compute node is at least one of a non-virtualized physical host, a virtual machine, or a container.

* * * * *